United States Patent
Vidal Clos et al.

(10) Patent No.: US 12,184,115 B2
(45) Date of Patent: Dec. 31, 2024

(54) SYSTEM AND METHOD FOR MANAGING ELECTRICAL POWER DRAWN FROM A VEHICLE ALTERNATOR

(71) Applicant: THERMO KING LLC, Minneapolis, MN (US)

(72) Inventors: Andreu Vidal Clos, Lleida (ES); Ryan Wayne Schumacher, Bloomington, MN (US)

(73) Assignee: THERMO KING LLC, Minneapolis, MN (US)

( * ) Notice: Subject to any disclaimer, the term of this patent is extended or adjusted under 35 U.S.C. 154(b) by 722 days.

(21) Appl. No.: 17/233,955

(22) Filed: Apr. 19, 2021

(65) Prior Publication Data

US 2021/0328453 A1 Oct. 21, 2021

(30) Foreign Application Priority Data

Apr. 21, 2020 (EP) .................................... 20382321

(51) Int. Cl.
*H02J 7/16* (2006.01)
(52) U.S. Cl.
CPC ............. *H02J 7/16* (2013.01); *H02J 2207/20* (2020.01)
(58) Field of Classification Search
CPC ........ H02J 7/16; H02J 2207/20; H02J 7/1438; H02J 2310/40; H02J 2310/58; H02J 7/34; H02J 1/14; Y02T 10/70; Y02T 10/92; B60R 16/03
USPC ...................................................... 320/104
See application file for complete search history.

(56) References Cited

U.S. PATENT DOCUMENTS

| | | | |
|---|---|---|---|
| 6,652,330 B1 | 11/2003 | Wasilewski | |
| 2006/0028778 A1* | 2/2006 | O'Gorman | H02J 1/14 361/62 |
| 2006/0043938 A1* | 3/2006 | O'Gorman | H02P 9/105 322/8 |
| 2007/0227499 A1* | 10/2007 | Asada | H02J 7/1446 290/40 C |
| 2009/0147551 A1* | 6/2009 | Rittiger | H02M 7/797 363/49 |
| 2013/0106176 A1* | 5/2013 | Jang | B60L 58/20 307/9.1 |
| 2013/0307489 A1* | 11/2013 | Kusch | B60L 58/20 320/167 |
| 2015/0247391 A1* | 9/2015 | Oliva | E21B 43/2406 166/272.3 |

(Continued)

FOREIGN PATENT DOCUMENTS

| | | |
|---|---|---|
| EP | 3626490 | 3/2020 |
| FR | 2973601 | 10/2012 |
| JP | 2008-283776 | 11/2008 |

OTHER PUBLICATIONS

Extended European Search Report, issued in the corresponding EP patent application No. 20382321.6, dated Jul. 31, 2020, 7 pages.

*Primary Examiner* — Paul Dinh
(74) *Attorney, Agent, or Firm* — HSML P.C.

(57) ABSTRACT

The present application relates to a system for managing electrical power drawn from a vehicle alternator to supply power to an auxiliary system The system comprises a controller configured to: determine an output voltage of the vehicle alternator; perform a comparison of the output voltage of the vehicle alternator to a threshold; and adjust a power demand of the auxiliary system according to the result of the comparison.

20 Claims, 5 Drawing Sheets

(56) References Cited

U.S. PATENT DOCUMENTS

| | | | | |
|---|---|---|---|---|
| 2016/0319758 A1* | 11/2016 | Pallett | .................... | H02P 9/008 |
| 2017/0012452 A1* | 1/2017 | Kang | ....................... | H02J 7/00 |
| 2017/0317626 A1* | 11/2017 | Leone | .................... | F02D 29/02 |
| 2020/0114846 A1* | 4/2020 | Ildiz | ..................... | B60R 16/033 |
| 2020/0185945 A1* | 6/2020 | Park | ....................... | H02M 3/04 |
| 2022/0046228 A1* | 2/2022 | Haskin | .................. | H04N 5/265 |

* cited by examiner

SYSTEM AND METHOD FOR MANAGING ELECTRICAL POWER DRAWN FROM A VEHICLE ALTERNATOR

FIELD OF THE INVENTION

The present disclosure relates to a system and method for managing electrical power drawn from a vehicle alternator.

BACKGROUND

Many different types of goods including, for example, foodstuffs and medicines, need to be maintained at a predetermined temperature or within a predetermined temperature range during transport in order to ensure that they arrive at their destination in a safe condition or in a condition of acceptable freshness.

To meet this need, temperature control solutions have been developed for goods vehicles such as vans, trucks and tractor-pulled trailers that may be used to transport such goods by road. Such vehicles may be supplied with or retrofitted with a temperature control unit or system, also referred to as a transport refrigeration unit (TRU), which is operative to maintain the temperature within a goods space of the host vehicle at a predetermined temperature or within a predetermined temperature range.

A traditional temperature control unit of this kind typically includes temperature control components such as a compressor, pump, condenser, heat exchanger and associated pipework forming a refrigeration system, and electrical components such as temperature sensors, a controller, and a display unit. A battery may also be provided to power the electrical components. Additionally or alternatively, a generator may be provided to generate electrical power to power the electrical components and to charge the battery.

The temperature control components such as the pump and compressor are typically mechanically driven by an engine of the host vehicle by means of a suitable mechanical coupling such as a drive belt. The generator (if provided) may also be mechanically driven in this way.

SUMMARY

The present disclosure relates to a system and method for managing a power demand of an auxiliary system that draws power from a vehicle alternator. The disclosed system and method can help to ensure that the power demand of the auxiliary system can be met by the vehicle alternator or by an auxiliary battery of the auxiliary system, or by a combination of the vehicle alternator and the auxiliary battery. The system and method of the present disclosure monitor an output voltage of the vehicle alternator and adapt the power demand of the auxiliary system to meet the power output capability of the vehicle alternator, by reducing the power demand of the auxiliary system if the alternator is unable to meet the power demand of the auxiliary system. In the event that the alternator has excess power output capacity the power demand of the auxiliary system can be increased and the excess power can be used, for example, to charge an auxiliary battery of the auxiliary system. Additionally or alternatively, in the event that there is difference between the power output capacity of the vehicle alternator and the power demand of the auxiliary system that leads to a shortfall in the power supply to the auxiliary system, the auxiliary battery can be used to compensate for the shortfall in power supplied to the auxiliary system by the vehicle alternator.

According to a first aspect, the invention provides a system for managing electrical power drawn from a vehicle alternator to supply power to an auxiliary system, the system comprising: a controller configured to: determine an output voltage of the vehicle alternator; perform a comparison of the output voltage of the vehicle alternator to a threshold; and adjust a power demand of the auxiliary system according to the result of the comparison.

The controller may be configured to adjust a current drawn by the auxiliary system to adjust the power demand of the auxiliary system.

The controller may be configured to switch off one or more loads of the auxiliary system to adjust the power demand of the auxiliary system.

The controller may be configured to adjust an operating mode of one or more loads of the auxiliary system to adjust the power demand of the auxiliary system.

The controller may be configured to:
if the output voltage of the vehicle alternator is greater than the threshold, increase the power demand of the auxiliary system.

The controller may be configured to:
if the output voltage of the vehicle alternator is less than the threshold, reduce the power demand of the auxiliary system (130).

The controller may be configured to:
if the output voltage of the vehicle alternator is equal to the threshold, maintain the power demand of the auxiliary system.

The system may further comprise an auxiliary battery for supplying power to the auxiliary system.

The controller may be configured to:
if the output voltage of the vehicle alternator is greater than the threshold, adjust a supply of electrical power to the auxiliary battery to charge the auxiliary battery.

The controller may be configured to:
if the output voltage of the vehicle alternator is lower than the threshold, couple the auxiliary battery to one or more loads of the auxiliary system such that the one or more loads of the auxiliary system are at least partially powered by the auxiliary battery.

The controller may comprise a proportional-integral controller, for example.

The system may further comprise a buck-boost converter coupled to an output of the vehicle alternator and operative to provide an electrical power supply to the auxiliary system.

According to a second aspect, the invention provides a method for managing electrical power drawn from a vehicle alternator to supply power to an auxiliary system, the method comprising:
determining an output voltage of the vehicle alternator;
performing a comparison of the output voltage of the vehicle alternator to a threshold; and
adjusting a power demand of the auxiliary system according to the result of the comparison.

Adjusting the power demand of the auxiliary system may comprise adjusting a current drawn by the auxiliary system, for example.

Additionally or alternatively, adjusting the power demand of the auxiliary system may comprise switching off one or more loads of the auxiliary system.

Additionally or alternatively, adjusting the power demand of the auxiliary system may comprise adjusting an operating mode of one or more loads of the auxiliary system.

Additionally or alternatively, adjusting the power demand of the auxiliary system may comprise:

if the output voltage of the vehicle alternator is greater than the threshold, increasing the power demand of the auxiliary system.

Additionally or alternatively, adjusting the power demand of the auxiliary system may comprise:

if the output voltage of the vehicle alternator is less than the threshold, reducing the power demand of the auxiliary system.

Additionally or alternatively, adjusting the power demand of the auxiliary system may comprise:

if the output voltage of the vehicle alternator is equal to the threshold, maintaining the power demand of the auxiliary system.

BRIEF DESCRIPTION OF THE DRAWINGS

Embodiments of the invention will now be described, strictly by way of example only, with reference to the accompanying drawings, of which.

DETAILED DESCRIPTION

Temperature control units for maintaining the temperature within a goods space of a goods vehicle at a predetermined temperature or within a predetermined temperature range are evolving away from traditional designs of the kind described above, which use the host vehicle's engine to provide motive power for components such as compressors, pumps and the like, in favour of designs in which such components are electrically powered by the host vehicle. One disadvantage of such electrically powered systems is that they may draw power from a battery of the vehicle that is also used to power low-voltage electrical systems of the vehicle, such as an audio system, a lighting system and the like. As will be appreciated, drawing power from the vehicle battery in this manner discharges the vehicle battery and could adversely affect the operation of the low-voltage electrical systems of the vehicle.

Figure 1:
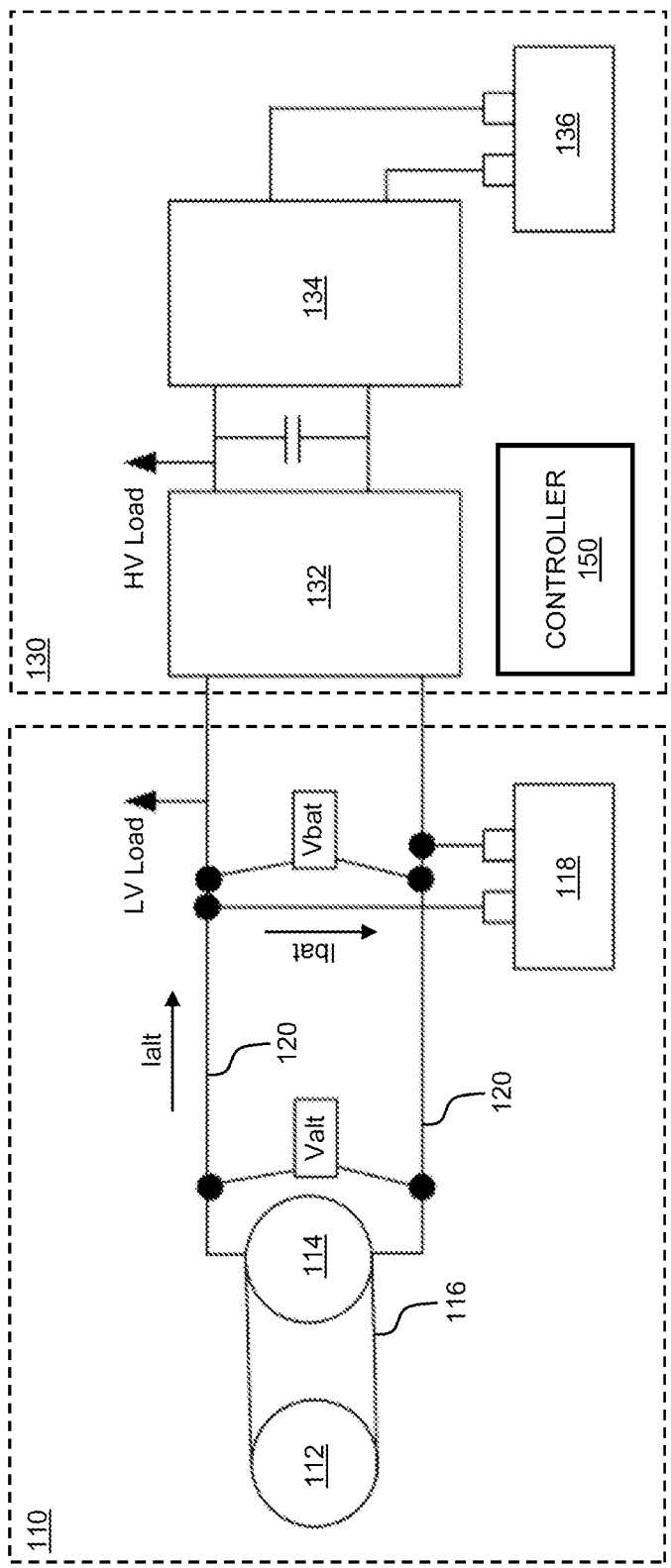
FIG. 1 is a schematic diagram showing relevant elements of a host vehicle and relevant elements of an auxiliary system that draws electrical power from an alternator of the host vehicle.

FIG. 1 is a schematic diagram showing relevant elements of a host vehicle (e.g. a goods vehicle) and elements of an auxiliary system that draws electrical power from an alternator of the host vehicle or from an auxiliary battery of the auxiliary system. The auxiliary system may be, for example, an electrically powered temperature control system for maintaining the temperature within a goods space of the host vehicle at a predetermined temperature or within a predetermined temperature range.

In FIG. 1 elements of the host vehicle are shown within box 110, whilst elements of the auxiliary system are shown within box 130.

The vehicle 110 includes an engine 112 which drives an alternator 114 via a suitable mechanical coupling or linkage 116, which may be, for example, a drive belt, drive shaft, drive chain or any other suitable mechanical linkage or coupling. Because the alternator 114 is part of the host vehicle 110 and is driven by the vehicle engine 112, the auxiliary system 130 has no control over the speed of the alternator 114, and thus the auxiliary system 130 should be able to operate efficiently regardless of the speed of the vehicle engine 112 and/or alternator 114.

The alternator 114 generates electrical power which can be used to charge a battery 118 of the vehicle 110, and to power low-voltage electrical loads of the vehicle such as a radio, interior lighting and the like, which are represented in FIG. 1 by the arrow labelled "LV Load".

The vehicle 110 further includes a battery bus 120 to which the alternator 114, vehicle battery 118 and low-voltage loads of the vehicle are coupled. The battery bus 120 distributes electrical power from the alternator 114 and the vehicle battery 118 to power the low voltage loads, and from the alternator 114 to the vehicle battery 118 to charge the vehicle battery. In the illustrated example the alternator 114 is a conventional low cost vehicle alternator such as a Lundell alternator, which includes a voltage regulator to provide a nominal alternator output voltage. Such alternators will be familiar to those skilled in the art and will not be discussed further here.

The auxiliary system 130 includes a first power converter 132, a second power converter 134, an auxiliary battery 136 and high-voltage loads, represented in FIG. 1 by the arrow labelled "HV Load". The high-voltage loads may include, for example, a compressor, a pump, a heater and other electrical components of a temperature control system.

The first power converter 132 is configured to convert a first voltage output by the alternator 114 into a second voltage, different from the first voltage, and to control current through the first power converter 132, so as to provide a voltage and current that are suitable for powering the high-voltage loads of the auxiliary system 130.

The second power converter 134 is coupled to the first power converter 132 and is configured to convert the second voltage output by the first power converter 132 into a third voltage, different from the second voltage, and to control current through the second power converter 134 to the auxiliary battery 136, so as to provide a voltage and current that are suitable for charging the auxiliary battery 136. The second power converter 134 is also configured to convert a fourth voltage output by the auxiliary battery 136 into a fifth voltage and to control current through the second power converter 134 from the auxiliary battery 134 so as to provide a voltage and current that are suitable for powering the high-voltage loads of the auxiliary system 130 if and when required.

The auxiliary battery 136 may be, for example, a 48 volt battery or a 400 volt battery.

The auxiliary system 130 further includes a controller 150, which is configured to determine a voltage at an electrical output of the alternator 114 (e.g. a voltage across output terminals of the alternator 114) and to manage a power demand of the auxiliary system 130 to ensure that the power demand of the auxiliary system 130 can be supplied by the alternator 114 and/or the auxiliary battery 136 without drawing electrical power from the vehicle battery 118, as will be explained in detail below. The controller 150 may comprise, for example, a processor, microprocessor or microcontroller executing appropriate instructions. The processor 150 may comprise or implement a proportional-integral (PI) controller.

Figure 2:
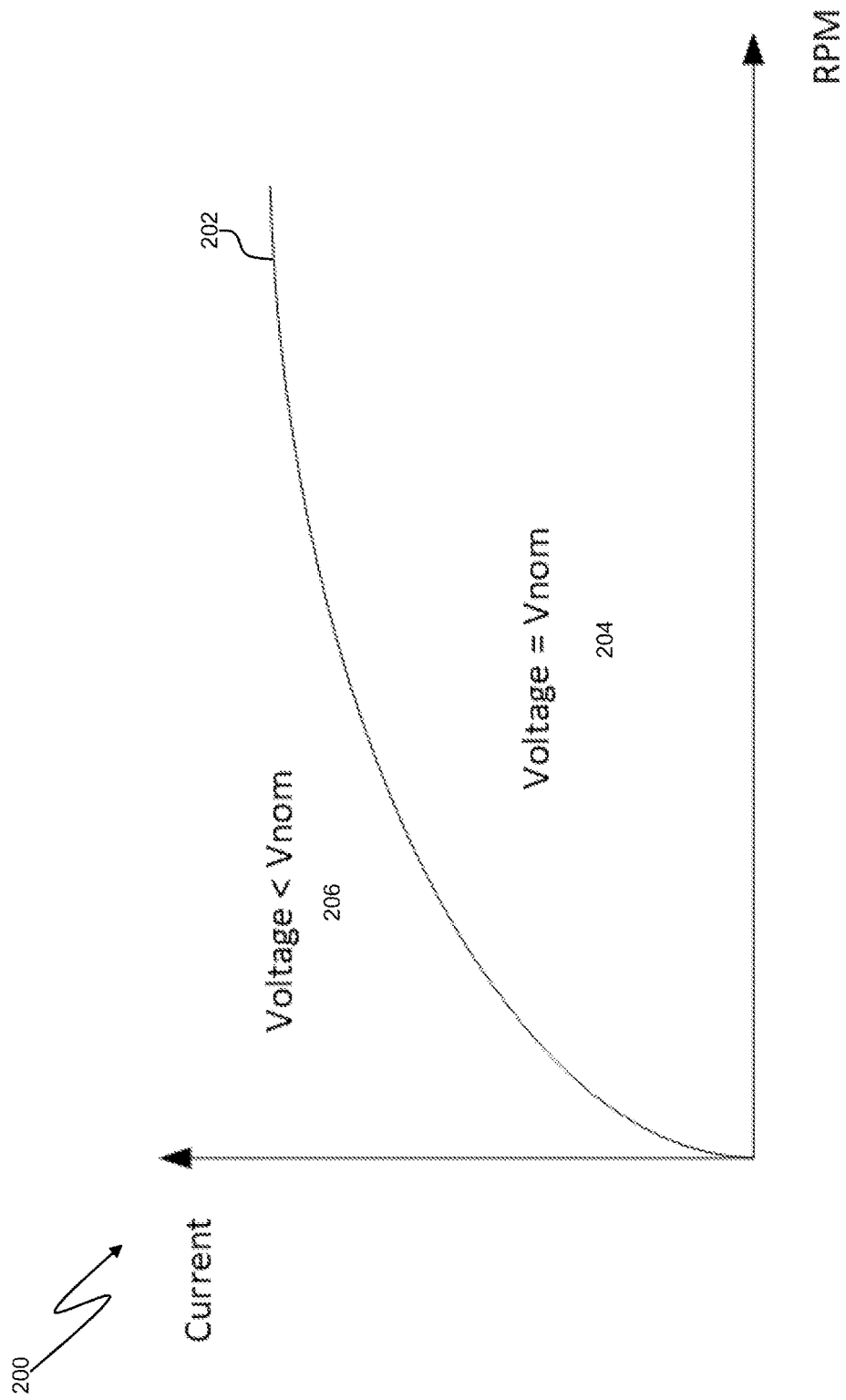
FIG. 2 is an example of a power curve illustrating a relationship between the speed of an alternator and an output current of the alternator.

FIG. 2 is an example of a power curve 202 illustrating a relationship between the speed of an alternator in revolutions per minute (RPM) and an output current of the alternator. As can be seen from the power curve 202 of FIG. 2 (and as will be familiar to those skilled in the art) the output current of the alternator increases (non-linearly) with the speed of the alternator. For example, the alternator may be rated or configured to supply an output current of 50 Amperes at 1500 RPM, and to supply an output current of 120 Amperes at 6000 RPM.

The alternator is specified to supply a nominal output voltage Vnom, which is an output voltage that can be supplied by the alternator provided that the total load current drawn from the alternator by any electrical loads coupled to the electrical output of the alternator is equal to or less than the rated current for a given alternator speed. Thus, for an alternator with a rated output current of 50 Amperes at 1500 RPM and a rated nominal output voltage Vnom of 13.5 volts, provided that the total load current does not exceed 50 Amperes, then the output voltage of the alternator will be 13.5 volts. However, if the total load current exceeds 50 Amperes, then the output voltage of the alternator will drop below 13.5 volts, and will continue to fall as the load current increases.

As illustrated in FIG. 2, in a region 204 below the power curve 202 (i.e. where the total load current is equal to or less than the rated output current for the alternator speed), the output voltage of the alternator will be Vnom, whereas in a region 206 above the power curve 202 (i.e. where the total load current is greater than the rated output current for the alternator speed), the output voltage of the alternator will be less than Vnom.

Figure 3:
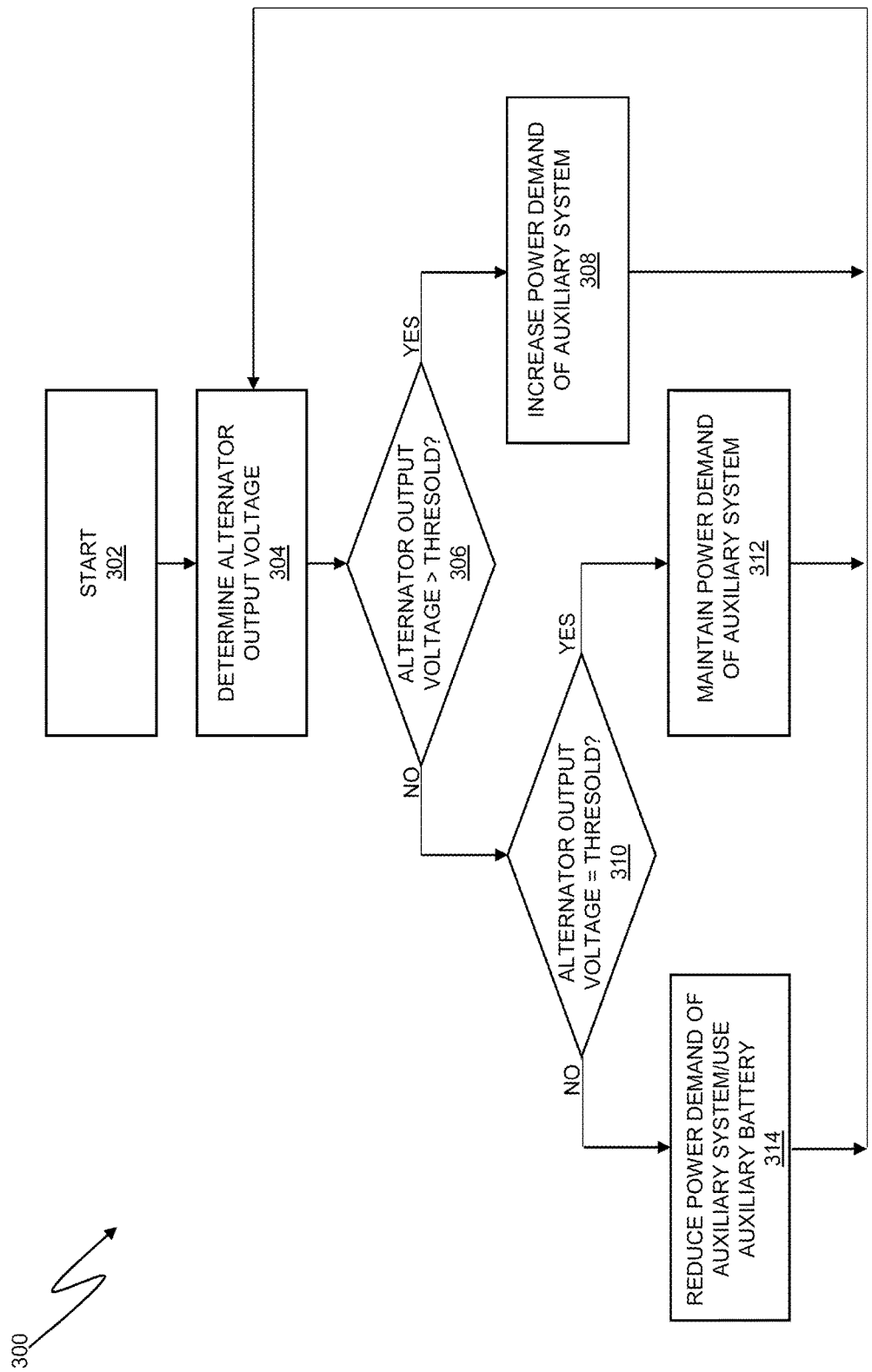
FIG. 3 is a flowchart illustrating steps in a method for managing a power demand of an auxiliary system to ensure that the power demand of the auxiliary system can be met without drawing power from a battery of a host vehicle.

Referring back to FIG. 1, the controller 150 of the auxiliary system 130 is configured to monitor the output voltage of the alternator 114 and to control the power demand of the auxiliary system 130, e.g. by controlling a current drawn by the first power converter 132, to ensure that the required power can be supplied by the alternator 114 alone, or by the alternator in combination with the auxiliary batter 136, without drawing power from the vehicle battery 118, as will now be explained with reference to FIG. 3.

FIG. 3 is a flowchart illustrating steps in a maximum power point tracking method that may be performed by the controller 150 in order to ensure that the required power can be supplied by the alternator 114 alone, or by the alternator in combination with the auxiliary battery 136, without drawing power from the vehicle battery 118.

The method (shown generally at 300 in FIG. 3) starts at step 302. At step 304 the controller 150 determines the output voltage Valt of the alternator 114. The controller 150 may determine the output voltage Valt of the alternator 114 in any convenient manner. For example the auxiliary system 130 may include conventional voltage sensor circuitry that continuously or periodically measures the output voltage Valt of the alternator 114 and reports the measured voltage Valt to the controller 150. Alternatively the controller 150 may periodically (e.g. every millisecond) poll such voltage sensor circuitry to determine the output voltage Valt of the alternator 114.

At step 306 the controller 150 compares the alternator output voltage Valt to a threshold value Vth. The threshold value Vth may be equal to, for example, a value Vnom-dV, where Vnom is the rated nominal output voltage of the alternator 114 and dV is a constant value that provides a degree of headroom to prevent small increases in the power demand (e.g. load current) of the auxiliary system 130 from causing the alternator output voltage Valt to fall below its rated or nominal output voltage Vnom.

If the alternator output voltage Valt, as determined at step 304, is different from the threshold value Vth the controller 150 adjusts (increases or decreases) a power demand of the auxiliary system 130, as described in detail below. For example, the controller 150 may be, or may implement, a PI (proportional-integral) regulator which takes as an input the error between the rated or nominal output voltage Vnom of the alternator 114 and the output voltage Valt of the alternator 114 (as determined at step 304) and calculates or provides as an output the current to be supplied by the first power controller 132, thereby adjusting the power demand of the auxiliary system 130 according to the alternator output voltage Valt. The controller 150 may be configured to implement hysteresis or some other form of intelligent control in order to prevent frequent changes in the power demand of the auxiliary system 130 ("hunting") which could lead to unnecessary or undesirable on-off toggling of loads (e.g. a compressor, pump, heater or the like) of the auxiliary system.

If the alternator output voltage Valt is greater than the threshold value Vth then the controller 150 increases a power demand of the auxiliary system 130 at step 308.

For example, the controller 150 may increase the amount of current supplied (e.g. by the first power controller 132) to one or more loads (e.g. a compressor, pump, heater or the like) of a temperature control system that forms part of the auxiliary system 130, or may adjust an operating mode of one or more such loads, e.g. to cause the load(s) to enter a high- or higher-power operating mode such as high- or higher-temperature mode for a heater or a high- or higher-speed mode for a pump. Alternatively or additionally the controller 150 may cause current to be supplied or diverted to the auxiliary battery 136, or may increase the amount of current or the voltage supplied to the auxiliary battery 136, to charge the auxiliary battery 136.

Following step 308 the method returns to step 304, at which the controller 150 again determines the alternator output voltage Valt, which is again compared to the threshold value Vth at step 306.

If, as a result of the comparison, the controller 150 determines that the alternator output voltage Vout is equal to the threshold value Vth (step 310), the controller 150 maintains the power demand of the auxiliary system 130, and the method returns to step 304, at which the controller 150 again determines the alternator output voltage Valt.

If, as a result of the comparison, the controller 150 determines that the alternator output voltage Valt is less than the threshold value Vth, at step 314 the controller 150 reduces the power demand of the auxiliary system 130 and/or uses the auxiliary battery 336 to supply the shortfall in power supplied by the alternator 114.

For example, the controller 150 may reduce the power demand of the auxiliary system 130 by switching off one or more loads of the auxiliary system such as, for example, a compressor, a pump, a heater or other electrical components of a temperature control system, or by adjusting an operating mode of one or more such loads (e.g. causing one or more of such loads to enter a low- or lower-power mode of operation). In this way the current required by the auxiliary system 130 can be reduced, thus reducing the power demand on the alternator 114.

If, despite such a reduction in the power demand of the auxiliary system 130, the alternator 114 is still unable to supply the required electrical power to the auxiliary system, or if reducing the power demand of the auxiliary system 130 is not possible or desirable (e.g. if doing so would cause a temperature within a load space of a host vehicle to increase above or otherwise deviate from a set point temperature) the controller 150 may cause the auxiliary battery 136 to be coupled to one or more of the loads of the auxiliary system 130 in order to supply the required power or to make up the difference between the power supplied to the auxiliary system 130 by the alternator 114 and the power demand of the auxiliary system 130. When the auxiliary battery 136 is coupled to one or more of the loads of the auxiliary system 130 in this way, the one or more loads of the auxiliary system 130 are thus at least partially powered by the auxiliary battery 136.

Figure 4:
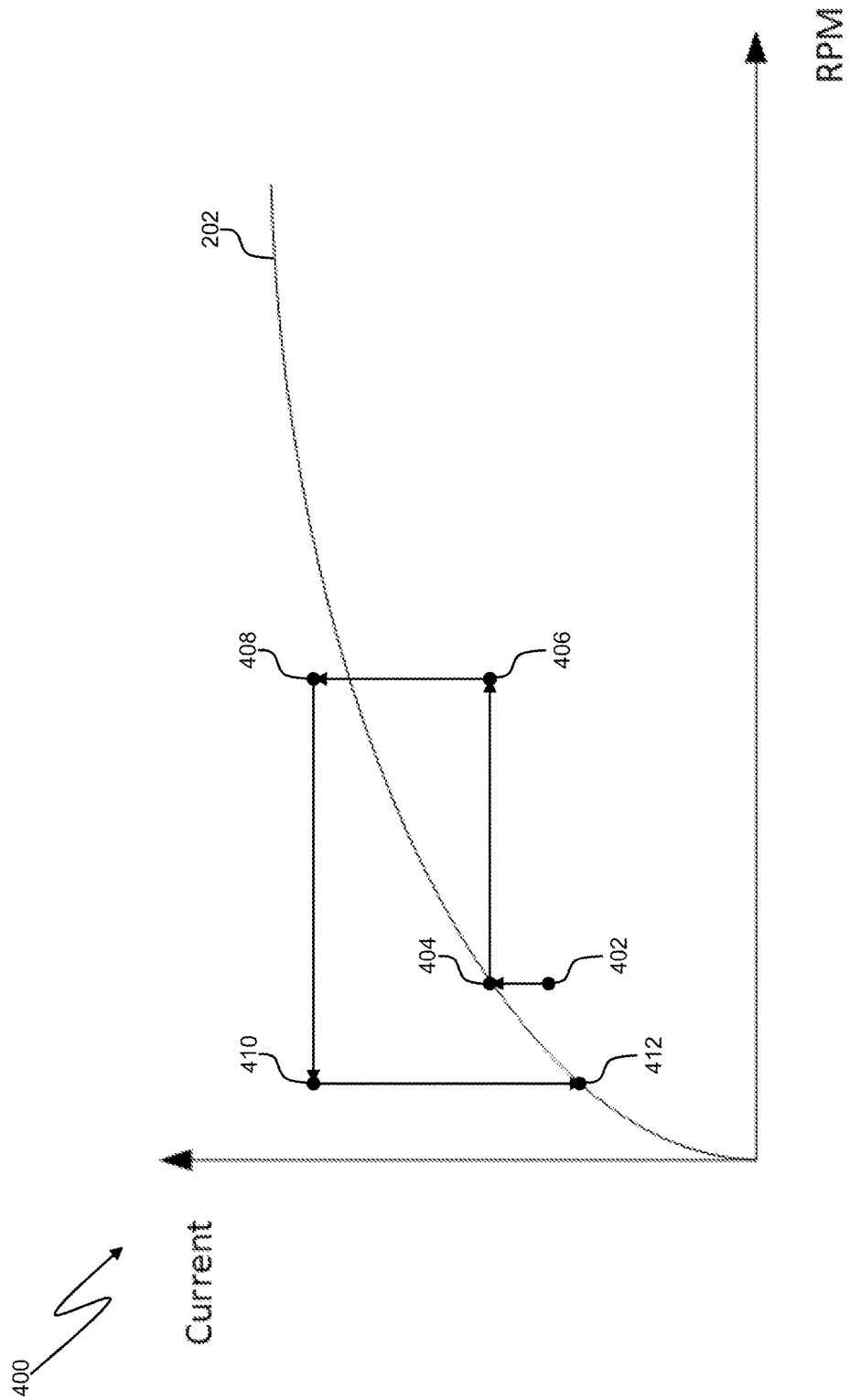
FIG. 4 is a graphical illustration of the operation of the method of FIG. 3 in relation to the power curve illustrated in FIG. 2.

FIG. 4 is a graphical illustration of the operation of the method 300 of FIG. 3 in relation to the power curve 202 illustrated in FIG. 2.

Initially, at a first point 402, the power demand of the auxiliary system 130 is below the power curve 202, and therefore the output voltage Valt of the alternator 114 is equal to Vnom. Thus, at step 306 the controller 150 determines that the alternator output voltage Valt is greater than the threshold value Vth, and so the controller 150 moves to step 308 at which the controller 150 increases the power demand of the auxiliary system 130 as discussed above, to a second point 404. The controller 150 then returns to step 304 of the method 300.

At the second point 404 the power demand of the auxiliary system 130 is on the power curve 202, and therefore the output voltage Valt of the alternator 114 is still equal to Vnom. Thus, at step 310 the controller 150 determines that the alternator output voltage Valt is equal to the threshold value Vth, and so the controller 150 moves to step 312 at which the controller 150 maintains the power demand of the auxiliary system 130 as discussed above, and returns to step 304 of the method 300.

Between the second point 404 and a third point 406 a host vehicle that incorporates the auxiliary system 130 accelerates, such that the speed of the alternator 114 increases. Thus the current that can be supplied by the alternator 114 increases.

Point 406 is under the power curve 202, so the alternator output voltage remains at Vnom. At step 306 the controller 150 determines that the alternator output voltage Valt is greater than the threshold value Vth, and so the controller 150 moves to step 308 at which the controller 150 increases the power demand of the auxiliary system 130 as discussed above, to a fourth point 408. The controller 150 then returns to step 304 of the method 300.

Between the fourth point 408 and a fifth point 410 the host vehicle decelerates, and thus the output current that can be supplied by the alternator 114 reduces. As a result (because the power demand of the auxiliary system 130 remains at the level set at point 406), the output voltage Valt of the alternator 114 falls below the threshold value Vth. Thus at step 310 the controller determines that the alternator output voltage Valt is smaller than the threshold value Vth and accordingly reduces the power demand of the auxiliary system 310 as discussed above, until the reduced power demand is such that the alternator output voltage Valt increases to the threshold value Vth at point 412. Alternatively the controller 150 may use the auxiliary battery 136 to make up the difference between the power demand of the auxiliary system 310 and the power that can be supplied by the alternator 114, thereby reducing the power demand of the auxiliary system 310 to the point 412 at which the reduced power demand is such that the alternator output voltage Valt returns to the threshold value Vth. In a further alternative the controller 150 may both reduce the power demand of the auxiliary system as discussed above and use the auxiliary battery 136 to make up the difference between the reduced power demand of the auxiliary system 310 and the power that can be supplied by the alternator 114.

As will be apparent from the discussion above, the system and method of the present disclosure permit the power demand of the auxiliary system 130 to be managed and controlled to ensure that the required power can be supplied by the alternator 114 alone, or by the alternator in combination with the auxiliary battery 136, without drawing power from the vehicle battery 118.

It is anticipated that the system and method described above will be used in conjunction with conventional vehicle alternators, e.g. Lundell style alternators, which are rated with a single nominal output voltage Vnom.

However, in a variant of the present disclosure a buck-boost regulator could be coupled to the alternator 114 in order to provide a controllable output voltage to the auxiliary system 130 as necessary or appropriate, as will now be described with reference to FIG. 5.

Figure 5:
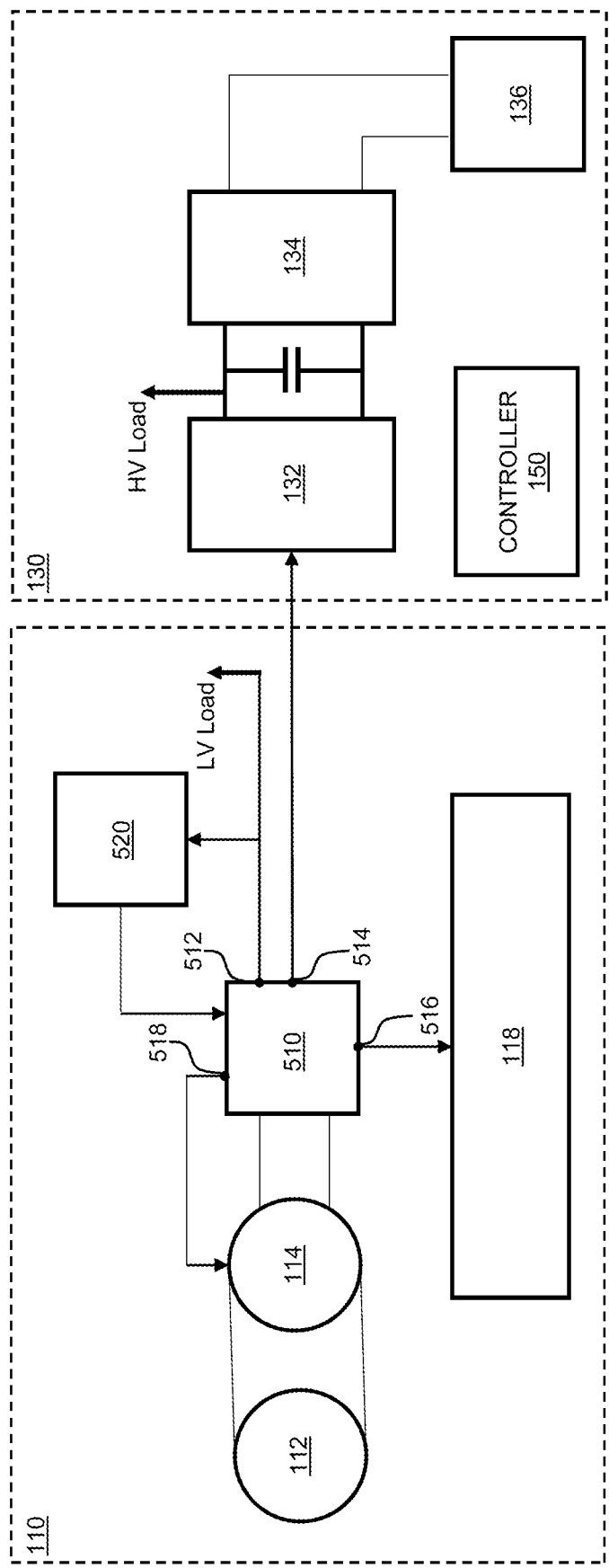
FIG. 5 is a schematic diagram showing relevant elements of a host vehicle and of an auxiliary system according to a variant of the present disclosure.

FIG. 5 is a schematic diagram showing relevant elements of a host vehicle (e.g. a goods vehicle) and elements of an auxiliary system that draws electrical power from an alternator of the host vehicle or from an auxiliary battery of the auxiliary system.

Elements that are common to FIGS. 1 and 5 are denoted by common reference numerals, and such elements will not be described in detail here, for the sake of clarity and brevity.

As in in FIG. 1, in FIG. 5 elements of the host vehicle are shown within box 110, whilst elements of the auxiliary system are shown within box 130.

In contrast with the arrangement illustrated in FIG. 1, in the arrangement of FIG. 5 the output terminals of the alternator 114 are not coupled to a battery bus 120. Instead, output terminals of the alternator 114 are coupled to a buck-boost converter 510 which is configured to receive an output of the alternator 114 and to generate a plurality (three, in the illustrated example) of buck-boost converter output voltages. Thus the buck-boost converter 510 has a first output 512 which supplies a first output voltage to power a buck-boost controller 520, which is operative to control the operation of the buck-boost converter 510. The first output 512 may also supply power to one or more other low voltage electrical systems of the host vehicle.

The buck-boost converter 510 has a second output 514 which supplies a second output voltage. The second output 514 is coupled to the first power converter 132 of the auxiliary system 130, which is operative to provide a power supply to one or more high voltage loads of the auxiliary system 130, as described above with reference to FIG. 1.

The buck-boost converter 510 has a third output 516 which is coupled to the vehicle battery 118 and is operative to provide an appropriate voltage and/or current to charge the vehicle battery 118.

The buck-boost converter 510 has a further output 518, which provides a field driver control signal to control a field strength in a rotor of the alternator 114.

The buck-boost converter 510 receives a control signal from the buck-boost controller 520, which controls aspects of the operation of the buck-boost converter 510, such as the voltages output at each of the first, second and third output 512-516.

The use of the buck-boost converter 510 allows multiple different output voltages to be generated from the electrical output of the alternator 114. Thus appropriate voltages can be generated to power different loads, which can have the effect of improving efficiency, e.g. by reducing resistive losses. For example, a 48 volt supply provided by the buck-boost converter 510 to an auxiliary system 130 configured to operate from a 48 volt supply could be coupled to components of the auxiliary system 130 using smaller gauge wiring than would be required to provide the same amount of electrical power with a 12 volt supply. The use of such smaller gauge wiring also has the effect of reducing weight.

Further, the output voltage at the output (e.g. the third output 516) of the buck-boost converter that is used to provide a charging power supply to the vehicle battery 118 (or a vehicle battery pack) can be adapted in accordance with battery parameters such as temperature, state of charge and other parameters, in order to increase charging efficiency and battery reliability.

Still further, as the buck-boost converter 510 controls the field in the rotor of the alternator 114, the amount of load placed on the vehicle engine 112 by the alternator 114 can be adjusted by adjusting the field in the rotor. Thus the buck-boost controller 520 can be coupled to other systems of the host vehicle 110 to receive relevant information from such systems and to adjust the load placed on the engine 112 by the alternator 114 accordingly, by adjusting the field driver control signal output by the buck-boost converter 510 appropriately. For example, the load placed on the engine 112 by the alternator 114 may need to be controlled to meet emissions requirements, engine speed requirements or to improve overall system efficiency. In instances where the load placed on the engine 112 by the alternator 114 needs to be controlled, the controller 150 may cease (temporarily) performing the maximum power point tracking method described above with reference to FIG. 3, such that the load on the engine 112 can be regulated by the field driver control signal output by the buck-boost converter 510.

Where the buck-boost converter 510 is provided, the method described above with reference to FIG. 3 may be performed to manage the electrical power drawn by the auxiliary system 130 from the alternator 114 so as to ensure that the auxiliary system 130 draws the maximum available power from the alternator 114 for a given alternator output voltage without drawing power from the vehicle battery 118. In such an arrangement, instead of monitoring the output voltage of the alternator 114, the controller 150 monitors the voltage supplied by the buck-boost converter 510 to the first power converter 132, e.g. via the second output 514 of the buck-boost converter.

Although in FIG. 5 the buck-boost converter 510 and the buck-boost controller 520 are shown as being part of the host vehicle 110, it will be appreciated that the buck-boost converter 510 and the buck-boost controller 520 could alternatively be provided as part of the auxiliary system 530 where appropriate.

It is to be noted that where a buck-boost regulator is provided the method described above with reference to FIG. 3 may be performed, where possible, in order to extract the maximum available power from the alternator 114 (for a given alternator output voltage). However, in circumstances in which the maximum power point tracking method of FIG. 3 is not compatible with the use of a buck-boost regulator, e.g. where a field driver control signal output by the buck-boost converter 510 is used to control the field in the rotor of the alternator 114, the controller 150 may cease (temporarily) performing the maximum power point tracking method.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A system for managing electrical power drawn from a vehicle alternator to supply power to an auxiliary system, the system comprising:
a controller configured to:
determine an output voltage (Valt) of the vehicle alternator;
perform a comparison of the output voltage (Valt) of the vehicle alternator to a threshold; and
adjust a power demanded by the auxiliary system from the vehicle alternator according to the result of the comparison to ensure that the power demanded by the auxiliary system can be supplied without drawing electrical power from a battery of the vehicle.

2. A system according to claim 1, wherein the controller is configured to adjust a current drawn by the auxiliary system to adjust the power demanded by the auxiliary system.

3. A system according to claim 1, wherein the controller is configured to switch off one or more loads of the auxiliary system to adjust the power demanded by the auxiliary system.

4. A system according to claim 1 wherein the controller is configured to adjust an operating mode of one or more loads of the auxiliary system to adjust the power demanded by the auxiliary system.

5. A system according to claim 1, wherein the controller is configured to:
if the output voltage of the vehicle alternator is greater than the threshold, increase the power demanded by the auxiliary system;
if the output voltage of the vehicle alternator is less than the threshold, reduce the power demanded by the auxiliary system; or
if the output voltage of the vehicle alternator is equal to the threshold, maintain the power demanded by the auxiliary system.

6. A system according to claim 1, wherein the system further comprises an auxiliary battery for supplying power to the auxiliary system.

7. A system according to claim 6, wherein the controller is configured to:
if the output voltage of the vehicle alternator is greater than the threshold, adjust a supply of electrical power to the auxiliary battery to charge the auxiliary battery.

8. A system according to claim 6, wherein the controller is configured to:
if the output voltage of the vehicle alternator is lower than the threshold, couple the auxiliary battery to one or more loads of the auxiliary system such that the one or more loads of the auxiliary system are at least partially powered by the auxiliary battery.

9. A system according to claim 1, wherein the controller comprises a proportional-integral controller.

10. A system according to claim 1, wherein the system further comprises a buck-boost converter coupled to an output of the vehicle alternator and operative to provide an electrical power supply to the auxiliary system.

11. A method for managing electrical power drawn from a vehicle alternator to supply power to an auxiliary system, the method comprising:
  determining an output voltage of the vehicle alternator;
  performing a comparison of the output voltage of the vehicle alternator to a threshold; and
  adjusting a power demanded by the auxiliary system from the vehicle alternator according to the result of the comparison to ensure that the power demanded by the auxiliary system can be supplied without drawing electrical power from a battery of the vehicle.

12. A method according to claim 11, wherein adjusting the power demanded by the auxiliary system comprises adjusting a current drawn by the auxiliary system.

13. A method according to claim 11, wherein adjusting the power demanded by the auxiliary system comprises switching off one or more loads of the auxiliary system.

14. A method according to claim 11, wherein adjusting the power demanded by the auxiliary system comprises adjusting an operating mode of one or more loads of the auxiliary system.

15. A method according to claim 11, wherein adjusting the power demand of the auxiliary system comprises:
  if the output voltage of the vehicle alternator is greater than the threshold, increasing the power demanded by the auxiliary system;
  if the output voltage of the vehicle alternator is less than the threshold, reducing the power demanded by the auxiliary system; or
  if the output voltage of the vehicle alternator is equal to the threshold, maintaining the power demanded by the auxiliary system.

16. A system according to claim 1, wherein the auxiliary system is an electrically powered temperature control system for maintaining a temperature within a goods space of a host vehicle at a predetermined temperature or within a predetermined temperature range.

17. A method according to claim 11, wherein the auxiliary system is an electrically powered temperature control system for maintaining a temperature within a goods space of a host vehicle at a predetermined temperature or within a predetermined temperature range.

18. A system according to claim 1, wherein the controller is configured to adjust the power demanded by the auxiliary system by at least one of:
  switching off one or more loads of the auxiliary system; and
  adjusting an operating mode of the one or more loads of the auxiliary system,
  wherein the one or more loads of the auxiliary system include one or more of a compressor, a pump, and a heater of a temperature control system.

19. A method according to claim 11, wherein adjusting the power demanded by the auxiliary system includes at least one of:
  switching off one or more loads of the auxiliary system; and
  adjusting an operating mode of the one or more loads of the auxiliary system,
  wherein the one or more loads of the auxiliary system include one or more of a compressor, a pump, and a heater of a temperature control system.

20. A system according to claim 1, wherein the controller is configured to adjust the power demanded by the auxiliary system from the vehicle to meet a power output capability of the vehicle alternator, to ensure that the power demanded by the auxiliary system can be supplied without drawing electrical power from the battery of the vehicle.

* * * * *